United States Patent
Wieczorek et al.

(10) Patent No.: US 8,923,837 B2
(45) Date of Patent: Dec. 30, 2014

(54) PROVISIONING A TELEPHONY NETWORK IN RESPONSE TO AN ELECTRONIC DEVICE ATTACHING TO THE NETWORK

(75) Inventors: Philippe Wieczorek, Saint Ismier (FR); Pierre-Yves Descombes, Haute-Savoie (FR); Michael R Kelly, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 13/272,700

(22) Filed: Oct. 13, 2011

(65) Prior Publication Data

US 2013/0095809 A1 Apr. 18, 2013

(51) Int. Cl.
*H04M 3/00* (2006.01)
*H04W 76/00* (2009.01)
*H04W 8/26* (2009.01)
*H04W 8/18* (2009.01)

(52) U.S. Cl.
CPC .............. *H04W 8/18* (2013.01); *H04W 76/00* (2013.01); *H04W 8/26* (2013.01)
USPC ......................................................... 455/418

(58) Field of Classification Search
USPC ............ 455/418, 419, 435.1, 447, 558, 414.1
See application file for complete search history.

(56) References Cited

U.S. PATENT DOCUMENTS

| | | | |
|---|---|---|---|
| 7,774,008 B2 | 8/2010 | Benaouda et al. | |
| 2005/0192035 A1* | 9/2005 | Jiang | 455/461 |
| 2005/0251445 A1 | 11/2005 | Wong et al. | |
| 2006/0079236 A1* | 4/2006 | Del Pino et al. | 455/445 |
| 2007/0254639 A1* | 11/2007 | Chmielewski et al. | 455/419 |
| 2009/0149175 A1* | 6/2009 | Lopresti et al. | 455/433 |
| 2009/0298518 A1 | 12/2009 | Busropan et al. | |
| 2010/0146117 A1 | 6/2010 | Hoeksel | |
| 2011/0053580 A1* | 3/2011 | Gutierrez et al. | 455/418 |

FOREIGN PATENT DOCUMENTS

| | | |
|---|---|---|
| WO | WO-02-060194 | 8/2002 |
| WO | WO-2009122219 A1 | 10/2009 |

OTHER PUBLICATIONS

SETRIX Smart Web Vision~Machine-to-Machine (M2M) Communication over GPRS Networks~Setrix AG~retrieved Mar. 23, 2011~5 pages.
International Search Report. Mail Date Dec. 26, 2012. Application No. PCT/US2012/051218.

* cited by examiner

*Primary Examiner* — Kwasi Karikari

(57) ABSTRACT

A technique includes, in response to an electronic device attaching to a telephony network, selecting a telephony number from a plurality of available telephony numbers to assign to the electronic device for a given session in which the electronic device is attached to the telephony network and provisioning the telephony network based at least in part on the assigned telephony number.

11 Claims, 7 Drawing Sheets

US 8,923,837 B2

PROVISIONING A TELEPHONY NETWORK IN RESPONSE TO AN ELECTRONIC DEVICE ATTACHING TO THE NETWORK

BACKGROUND

Machine-to-machine communications are ever increasingly becoming a part of modern life. In this regard, machines such as intelligent cars, global positioning satellite (GPS) devices, smart utility power meters, etc., are examples of machines that communicate with other machines in everyday life. Many of these machine-to-machine communications rely on communications over a cellular network. A telephony number may therefore be assigned to such a machine, regardless of whether the machine ever actually uses the network.

DETAILED DESCRIPTION

Figure 1:
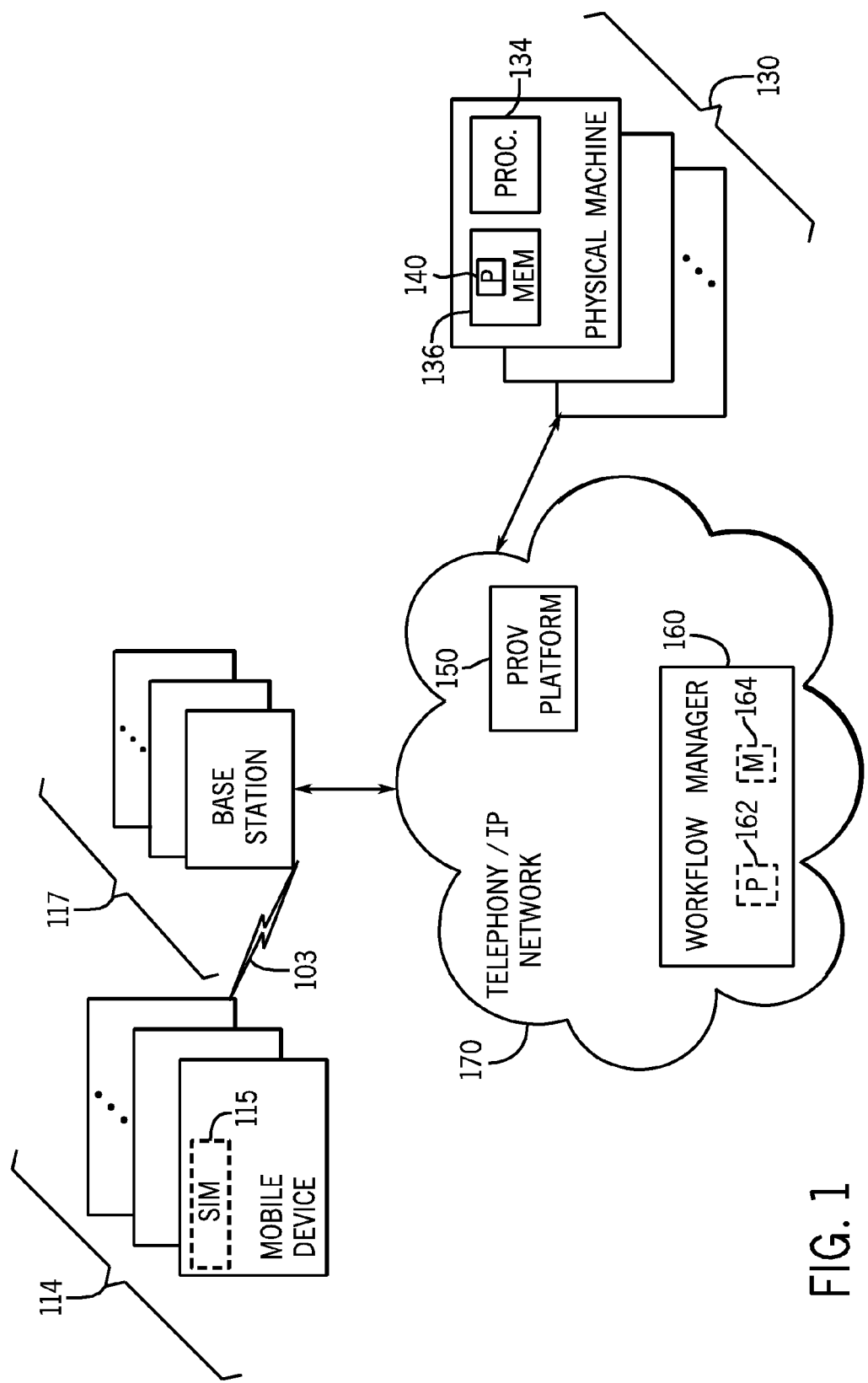
FIG. 1 is a schematic diagram of a telephony system according to an example implementation.

Referring to FIG. 1, in accordance with example implementations, one or multiple mobile telephony devices 114 (herein called the "mobile devices 114") may use a telephony/Internet protocol (IP) network 170 (herein called the "telephony network 170") for purposes of communicating voice and/or data with processor-based machines as well as other mobile and landline-based telephony devices.

For the non-limiting examples that are disclosed herein, the telephony network 170 may be a Global System for Mobile communications (GSM) network; and as non-limiting examples, the mobile devices 114 may be any of a number of different end telephony devices that use the telephony network 170 for voice and/or data communications, such as handheld personal wireless communication devices (smartphones, cellular telephones and so forth) that include human-operated user interfaces (touchscreens, keypads, etc.); modems that are connected to processor-based machines, such as portable or desktop computers; cellular access points; communication modules (GSM modules, as a non-limiting example) that are employed by, in general, any machine (processor-based machines, for example) for purposes of effecting machine-to-machine communications or machine-to-human communications; and so forth. As non-limiting examples, machines that may use the mobile devices 114 include motor vehicles (that include various diagnostic sensors, for example); global positioning satellite (GPS) devices; smart utility power meters; sensors; etc. Moreover, a given mobile device 114 may or may not have voice capabilities, depending on the particular implementation.

Although mobile devices are discussed below, the techniques and systems that are disclosed herein may likewise apply to any electronic device (a network printer, for example) that uses a telephony network for purposes of data and/or voice communications.

For the non-limiting examples that are disclosed herein, the mobile device 114 has a subscriber identity module (SIM) card 115, which stores data that allows the mobile device 114 to communicate using the telephony network 170. The SIM card 115 has an associated international mobile subscriber identity (IMSI), which is a number that is stored on the SIM card 115 and contains three parts: a mobile country code, a mobile network code and a mobile subscriber identify number.

Traditionally, a SIM card may be pre-provisioned with a telephony number, such as a mobile subscriber integrated services digital network (MSISDN) number, for example, before the SIM card 115 is used for the first time. The MSISDN number identifies a subscription for using the telephony network 170. The MSISDN is traditionally the dialable, or routable, number that is dialed by another telephony device to reach the corresponding subscriber for purposes of voice channel communications. Traditionally, the MSISDN number is a fifteen digit number which has three components to direct the routing of a call: a country code; a number planning area or national destination code; and a subscriber identification.

MSISDN numbers are increasingly becoming scarce resources, especially in view of the ever increasing number of machine-based telephony devices that are being manufactured and are being assigned MSISDN numbers. A conventional GSM subscriber provisioning model involves associating a given set of IMSI numbers with a corresponding set of MSISDN numbers such that these MSISDN numbers are provisioned into the GSM network before the SIM cards having the IMSI numbers are distributed in the retail channel. This traditional provisioning model therefore allocates one MISIDN number per IMSI number, even if the associated SIM card is never used (i.e., even if the associated mobile device 114 never attaches to a telephony network).

In accordance with example implementations that are disclosed herein, the number of MSISDN numbers allocated for the mobile devices 114 may be significantly smaller than the number of mobile devices 114, as the MSISDN numbers are assigned from a pool of recycled/recyclable MSISDN numbers. Therefore, mobile devices 114 that actually use the telephony network 170 are assigned MSISDN numbers from this pool; and MSISDN numbers of mobile devices 114 that were once using but are no longer using the telephony network 170 return to the pool for assignment to other mobile devices 114.

Therefore, the number of MSISDN numbers that are allocated for the mobile devices 114 is kept relatively small to preserve the MSISDN resources. Thus, due to the recycling of the MSISDN numbers, a relatively limited number of MSIDSN numbers are used, while allowing the mobile devices 114 to benefit from basic cellular functionalities, such as authentication, authorization, billing, traceability, roaming and geolocalization. Thus, the mobile devices 114 may leverage on existing telephony infrastructure while imparting a limited impact.

As a non-limiting example of such a mobile device 114, a given mobile device 114 may be a GSM module of a sensor that relatively infrequently powers up (i.e., "wakes up") and transmits acquired sensor data over the network 170. In this manner, the mobile device 114 for this example may be employed for machine-to-machine communications in which the device 114 communicates sensor data over the telephony network 170 with another machine, which may be, for example, a processor-based server (for example) that analyzes and/or reports the acquired sensor data to end users or other machines.

In accordance with example implementations, for purposes of further limiting the impact of the mobile devices 114 on the relatively limited number of available MSISDN numbers, the MSISDN numbers available for the mobile devices 114 are non-dialable, or non-routable, numbers. In this manner, by being a non-routable number, the MSISDN number does not consume an MSISDN number that permits mobile telephony devices to conduct voice channel communications. The choice of a non-routable number may be available because relatively few countries make use of all of the digits that are potentially available in the MSISDN number for their numbering plans. Therefore, these digits may be used to create unique but non-routable MSISDN numbers. For example, the subscriber identification portion of the MSISDN number may not be used in a given country. Therefore, as a non-limiting example, the mobile devices 114 may share the same country code and number planning area/national destination code, while using the subscriber identification portion of the MSISDN number to specifically identify the different mobile devices 114. As a non-limiting example, the subscriber identification portion codes for the different mobile devices 114 may be derived from the corresponding IMSI numbers. Although the MSISDN number may be a non-routable number, a mobile device 114 that is assigned to a non-routable MSISDN number may still, however, conduct data communications over the telephony network 170.

In accordance with some example implementations, a given mobile device 114 may be used for voice communications while not using traditional voice channels for these communications. For example, in accordance with some example implementations, the mobile device 114 may be a portable, or handheld, human-operated device, which is used for purposes of voice communications. These communications, however, occur using data path communications, such as Voice over Internet Protocol (VoIP), communications; and as such, the mobile device 114 does not rely on a dialable, or routable MSISDN number.

Thus, the mobile devices 114 may use their non-routable MSISDN numbers to communicate, because data channels of the telephony network 170 may be used for data and/or voice communication purposes. As non-limiting examples, such data services are Short Message Service (SMS), Unstructured Supplemental Services Data (USSD) and General Packet Radio Services (GPRS), may be used for purposes of permitting the mobile devices 114 to communicate data over the telephony network 170, without the devices 114 being assigned dialable, or routable, MSISDN numbers. The SMS data service may use a short message service center (SMSC), for purposes of sending short messages, commonly called "text messages," between the mobile devices 114. In general, the SMSC may temporarily store a short message for an unavailable recipient telephony device and then subsequently forward the short message to the recipient telephony device when the recipient telephony device becomes available.

Unlike the SMS data service, the USSD data service allows a real time data connection, which permits the mobile device 114 to communicate with the service provider's computers for such purposes of location based content services, services to configure the mobile device 114, and so forth. The GPRS service is a packet switched data service and may particularly be useful if a given mobile device 114 employs VoIP communications.

In accordance with other example implementations, one or multiple MSISDN numbers that are assignable to the mobile devices 114 may be routable numbers. In other words, for these implementations, the mobile devices 114 may be assigned MSISDN numbers, which may be called by other telephony devices for purposes of establishing voice channel communications over the telephony network 170.

Figure 2:
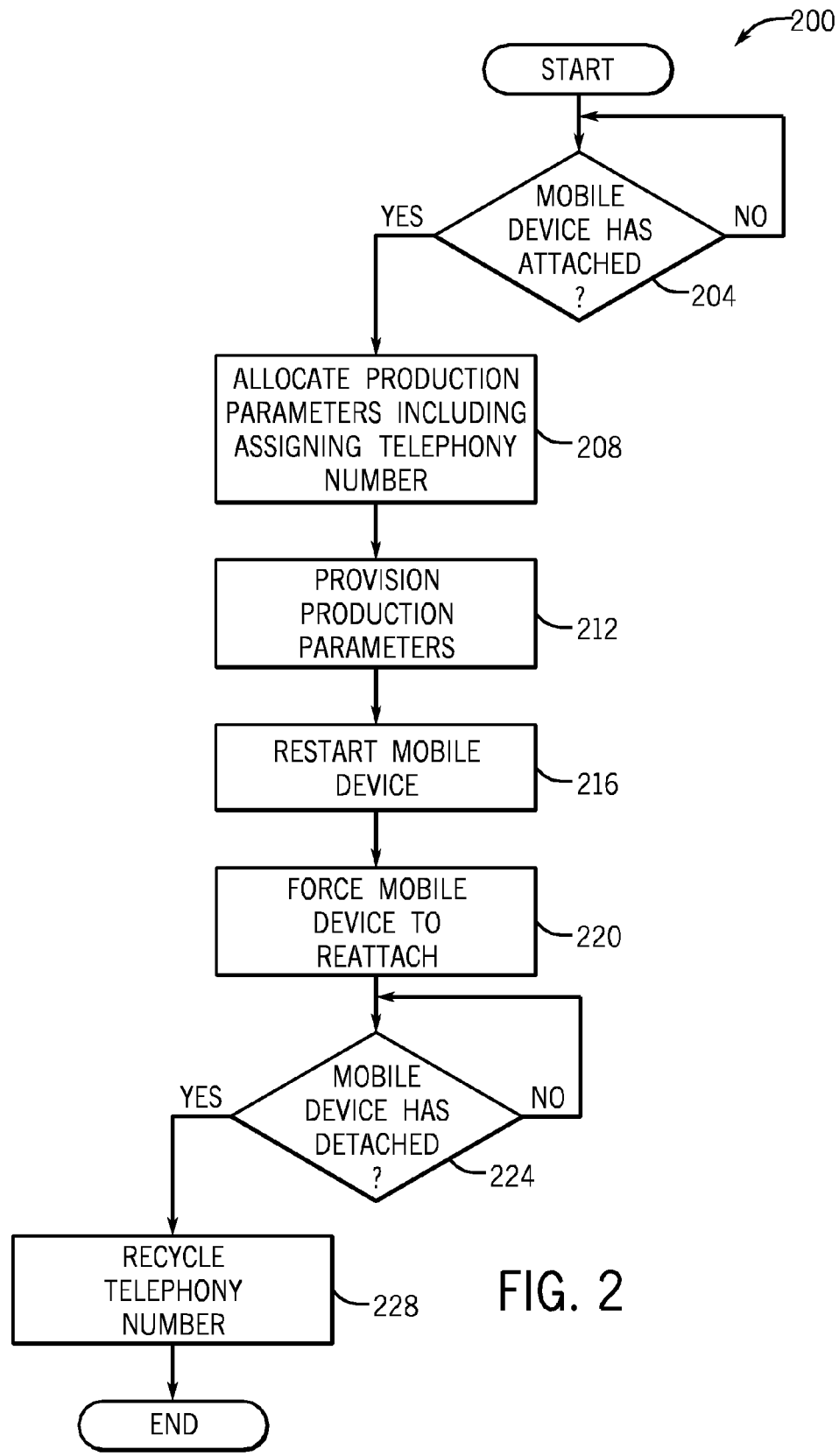
FIG. 2 is a flow chart depicting a technique to assign a telephony number to a mobile telephony device and provision a telephony network based on this assignment according to an example implementation.

In accordance with example implementations, a routable or non-routable MSISDN number (depending on the implementation) is assigned to a given mobile device 114 and the telephony network 170 is provisioned accordingly in response to the device 114 attaching to the network 170. In this context, the mobile device 114 "attaches" to the telephony network 170 when the device 114 has connected to the network 170, and the network 170 has authenticated the identification credentials (e.g., the IMSI number and the subscriber authentication key) of the mobile device 114. In this manner, referring to FIG. 2 in conjunction with FIG. 1, in accordance with example implementations, a technique 200 includes determining (decision block 204) whether a mobile device 114 has attached to the telephony network 170 and allocating (block 208) production parameters for the mobile device 114, including an assigned telephony number (an MSISDN number, for example), pursuant to block 208. In general, a "production parameter" refers to any parameter that is used to activate the SIM card 115 of the mobile device 114 and/or support the use case of the mobile device 114. In this context, the "use case" refers to the type or category of subscription for the mobile device 114. As non-limiting examples, the use case may refer to a prepaid subscription, a postpaid subscription, a modem subscription, and so forth. As non-limiting examples, the production parameters may include the MSISDN number, the IMSI number, an SMS center (SMSC) identity, etc.

Next, the technique 200 includes provisioning (block 212) the allocated production parameters for the mobile device 114 and restarting the mobile device 114, pursuant to block 216, which causes the mobile device 114 to detach from the telephony network 170 for purposes of allowing the mobile device 114 to subsequently reattach to the network 170 so that the mobile device 114 may furnish its new credentials (telephone number, keys, etc) to begin a session on the telephony network 170. In this context, a "session" refers to the mobile device's access to the telephony network 170 based on the credentials (telephony number, etc.) that have been assigned to the mobile device 114. As an example, the mobile device 114 may be restarted by the telephony network 170 communicating an SMS or USSD Notify message to a user of the mobile device 114 to instruct the user to restart the mobile device 114. As another example, a SIM-based applet on the mobile device 114 may be remotely activated by the telephony network 170 to restart the mobile device 114. In some implementations, the mobile device 114 is forced (block 220) to reattach to the telephony network 170 to begin the session on the telephony network 18. As a non-limiting example, the telephony network 170 may send one or multiple messages (GSM mobile application part (MAP) messages, for example) to cancel the attachment of the mobile device 114, which causes the mobile device 114 to reattach. When a determination is made (decision block 224) that the mobile device 114 has subsequently detached from the telephony network 170, the telephony number that is assigned to the mobile device 114 is returned to the pool of available telephony numbers, or recycled, pursuant to block 228.

Referring back to FIG. 1, the telephony network 170 may communicate with the mobile devices 114 via various base stations 117 that communicate wirelessly (via wireless links 103) with the mobile devices 114. As described further herein, the telephony network 170 includes a workflow manager 160 for such purposes as assigning the MSISDN numbers, recycling the MSISDN numbers and provisioning the telephony network 170 for the mobile devices 114 that are attached to the telephony network 170.

In general, the workflow manager 160 may be a processor-based machine, in accordance with example implementations. In this manner, the workflow manager 160 may include one or multiple processors 162 (one or multiple central processing units (CPUs), for example) and a memory 164 (a non-transitory memory, such as a semiconductor memory, a magnetic storage-based memory and/or an optical storage-based memory, as non-limiting examples), which may store one or multiple sets of machine executable instructions for purposes of causing the processor(s) 162 to perform one or more of the techniques (such as technique 200 described above) that are disclosed herein. As also depicted in FIG. 1, the telephony network 170 may include a carrier provisioning platform 150, which is the platform (processor-based platform, for example) that the particular wireless carrier uses for provisioning the network 170.

As also depicted in FIG. 1, one or multiple physical machines 130 may be coupled to the telephony network 170 for such purposes as conducting machine-to-machine communications with the mobile devices 114; communicating plans and profiles for the mobile devices 114 to the telephony network 170; etc. As depicted in FIG. 1, a given physical machine 130 may include one or multiple processors 134 (one or more multiple central processing units (CPUs), for example) and a memory 136 that stores one or multiple sets of machine executable program instructions 140, which when executed by the processor(s) 134 cause the physical machine 130 to communicate with a given mobile device 114; communicate plans and profiles for a given mobile device 114 to the telephony network 170; etc. The memory 136 may be a non-transitory memory, such as a semiconductor memory, a magnetic storage-based memory and/or an optical storage-based memory, as non-limiting examples.

Figure 3:
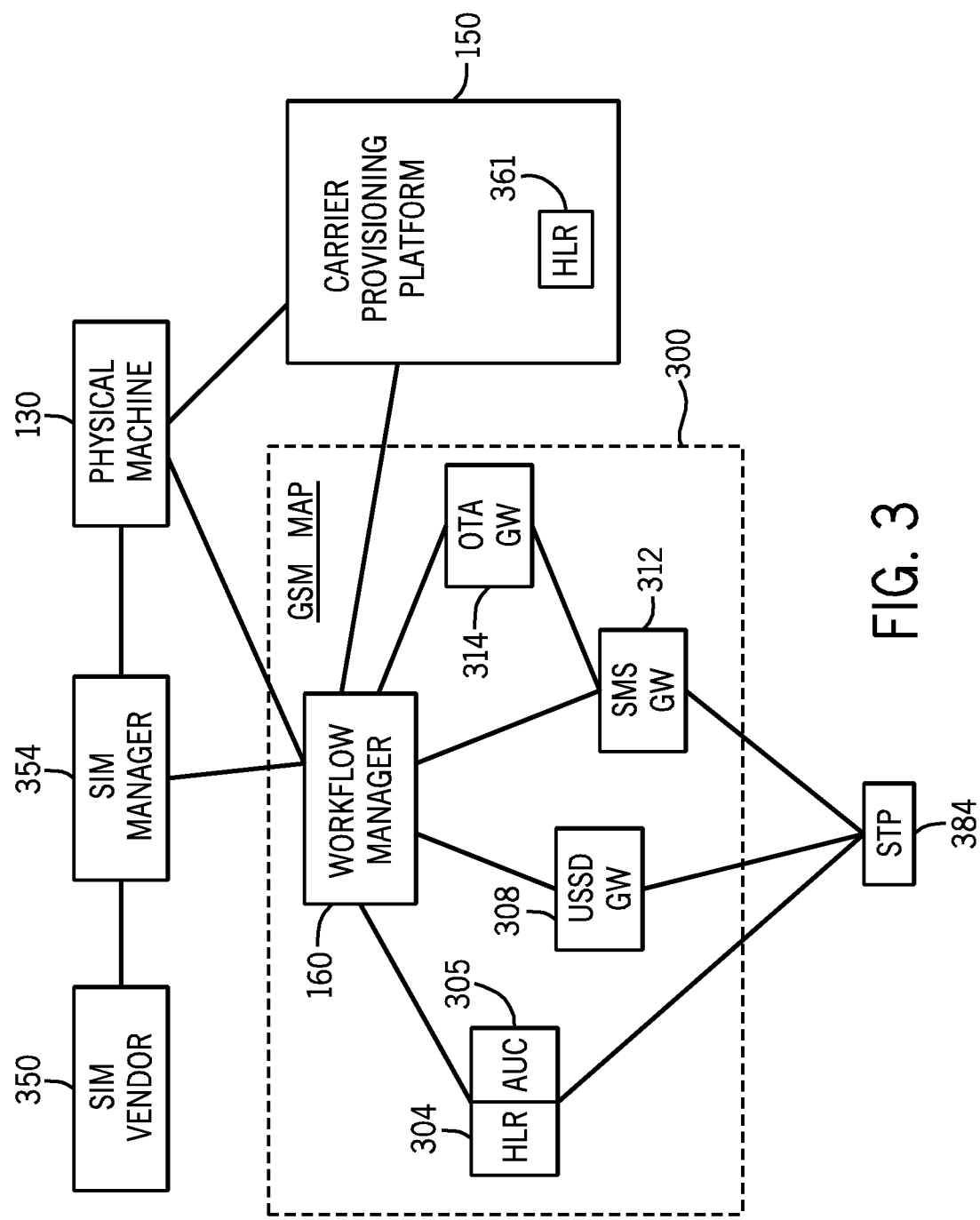
FIG. 3 is a schematic diagram of a Global System for Mobile communications (GSM) mobile application part (MAP) and associated network components according to an example implementation.

Referring to FIG. 3, in accordance with some example implementations, the workflow manager 160 may be part of a GSM mobile application part (MAP) 300. In general, the GSM MAP 300 is a network that includes and connects a distributed computer infrastructure of the GSM network, such as a home location register (HLR) 304, an authentication center 305, a USSD gateway 308 and an SMS gateway 314. In general, the HLR 304 is a database that contains subscription information for the mobile devices 114 and the current locations of the mobile devices 114; and the authentication center 305 is a database of identification and authentication information for the subscribers.

As also depicted in FIG. 3, the GSM Map 300 may include an Over-The-Air (OTA) gateway 314, which permits the wireless communication with and downloading of information to the SIM cards 115 (FIG. 1) of the mobile devices 114. All of the above-described components of the GSM MAP 300 communicate with the workflow manager 160, as further described herein. Moreover, the workflow manager 160 communicates with a given attached mobile device 114 via a signal transfer point (STP) 384; and the workflow manager 160 may also communicate with the carrier provisioning platform 150, as further described below.

In general, a SIM vendor 350 may use a SIM manager 354 for purposes of generating SIM output files for the inventory of SIM cards 115 (see FIG. 1) for the mobile devices 114. In this context, a "SIM output file" refers to an electronic file that contains data, which describes the parameters (keys, credentials, ciphering key generating algorithm, IMSI, etc) of a corresponding SIM card 115, which are to be provisioned on the telephony network 170. Moreover, as depicted in FIG. 3, one or multiple physical machines 130 may communicate with the workflow manager 160 for purposes of loading various international mobile subscriber identity (IMSI)/MSISDN plans and profiles to be used to provision the telephony network 170 for the inventory of SIM cards 115.

Figure 4:
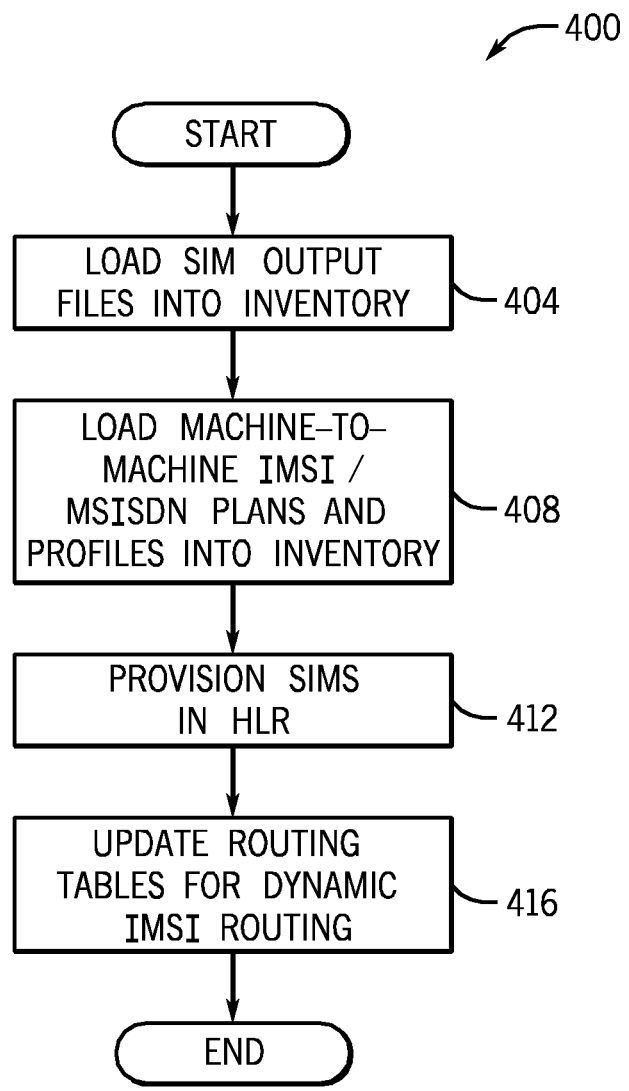
FIG. 4 is a flow chart depicting a technique to initialize the telephony network of FIG. 3 prior to a mobile telephony device attaching to the telephony network according to an example implementation.

Certain provisioning measures are undertaken before any of the mobile devices 114 attach to the telephony network 170 for the first time. More specifically, referring to FIG. 4 in conjunction with FIG. 3, in accordance with example implementations, a technique 400 includes loading (block 404) SIM output files into the inventory of SIM output files for SIM cards 115 that may potentially be used by the mobile devices 114. Next, according to the technique 400, machine-to-machine IMSI/MSISDN plans and profiles are loaded into the inventory, pursuant to block 408. Using the loaded inventory, the workflow manager 160 provisions the SIMs in the HLR 304 using such provisioning parameters as the IMSI number and the authentication keys (k). When dynamic IMSI routing is employed, the workflow manager 160 also updates (block 416) routing tables in the carrier provisioning platform 150.

Figure 5:
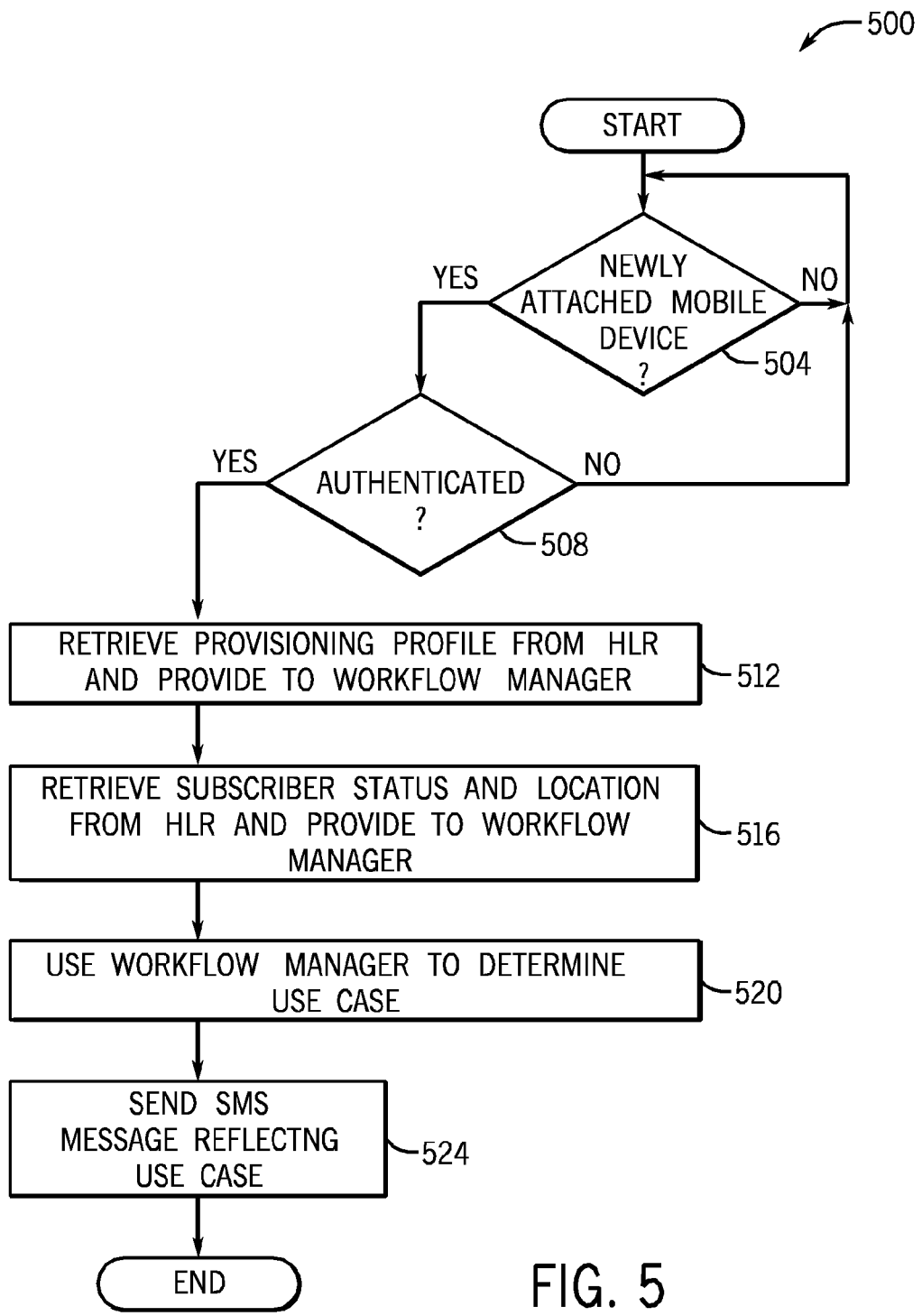
FIG. 5 is a flow chart depicting a technique performed by a workflow manager of the MAP of FIG. 3 in response to a mobile telephony device attaching to the telephony network according to an example implementation.

Referring to FIG. 5 in conjunction with FIG. 3, in accordance with some implementations, the workflow manager 160 performs a technique 220 when a mobile device 114 attaches to the telephony network 170. Pursuant to the technique 220, the workflow manager 160 determines (decision block 504) whether a mobile device 114 has attached to the telephony network 170, and if so, the workflow manager 160 uses the authentication center 305 to authenticate the mobile device 114. This authentication may involve the authentication center 305 comparing a signal response transmittal by the mobile device 114 with a signal response that is calculated by the center 305. If the workflow manager 160, based on signaling received from the authentication center 305, determines (decision block 508) that the mobile device 114 has been authenticated, then the workflow manager 160 retrieves (block 512) the corresponding provisioning profile from the HLR 304 and retrieves (block 516) the subscriber status and location from the HLR 304.

The workflow manager 160 next determines the use case for the mobile device 114, pursuant to block 520, and the workflow manager 160 uses the SMS gateway 314 to send an SMS message (an SMS welcoming the user of the mobile device 114 to the network, for example) to the mobile device 114, which reflects the use case for the mobile device 114, pursuant to block 524.

Figure 6:
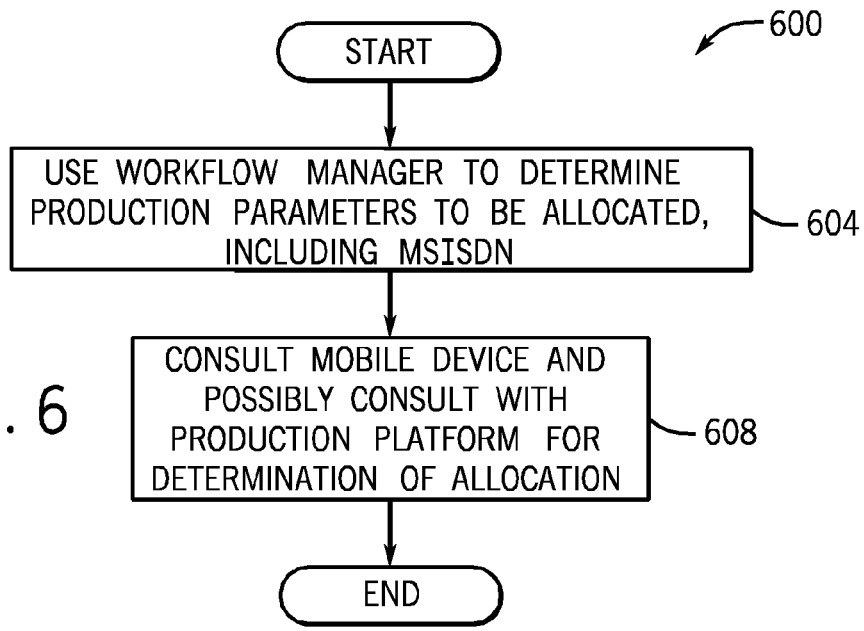
FIG. 6 is a flow chart depicting an allocation performed by the workflow manager of the MAP of FIG. 3 according to an example implementation.

Referring to FIG. 6 in conjunction with FIG. 3, in accordance with some example implementations, the workflow manager 160 performs a technique 600 for purposes of allocating production parameters (MSISDN, IMSI, SMSC identity, as non-limiting examples) for the determined use case for the mobile device 114. Pursuant to the technique 600, the workflow manager 160 first determines (block 604) the production parameters and consults (block 608) with the mobile device 114 and possibly the carrier provisioning platform 150 to allocate parameters for the use case for the mobile device 114.

Figure 7:
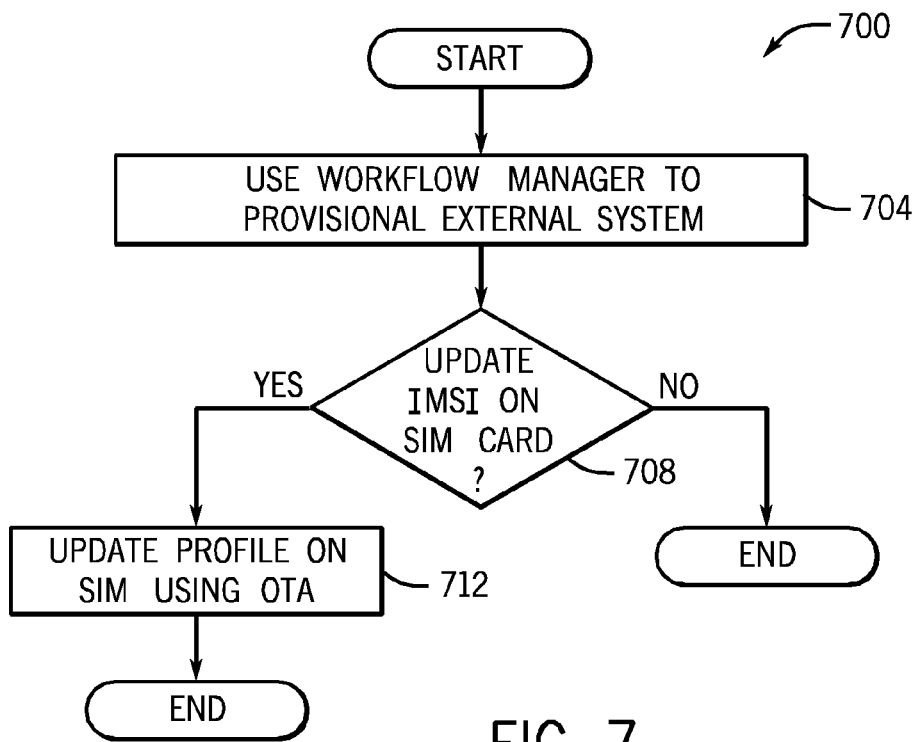
FIG. 7 is a flow chart depicting a technique performed by the workflow manager of the MAP of FIG. 3 to provision the telephony network according to an example implementation.

Referring to FIG. 7 in conjunction with FIG. 3, the workflow manager 160 next performs a technique 700 to provision the telephony network 170, pursuant to block 704, and determine (decision block 708) whether the IMSI number that is stored on the SIM card 115 should be updated. In this manner, if the IMSI number is to be updated, the workflow manager 160 may, in accordance with some implementations, update (block 712) the SIM card 115 using the OTA gateway 314. More specifically, the update of the profile on the SIM card 115 may be performed using OTA communication techniques to update Elementary Files (EF) on the SIM card 115, such as IMSI and SMSC EFs, as non-limiting examples.

Figure 8:
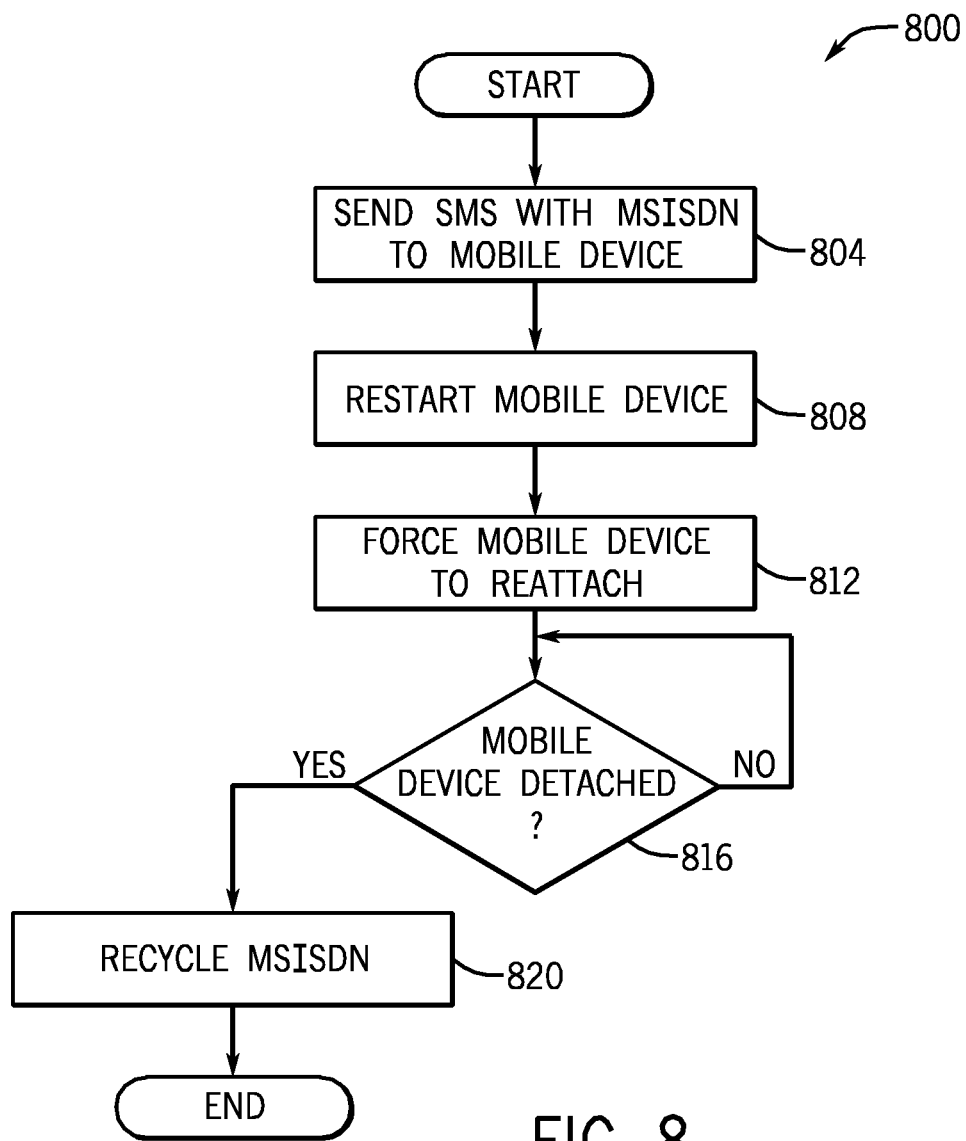
FIG. 8 is a flow chart depicting a technique performed by the workflow manager of the MAP of FIG. 3 to handover a newly attached mobile telephony device to the telephony network and recycle the telephony number assigned to the mobile telephony device when the device detaches from the network according to an example implementation.

After the telephony network 170 has been provisioned, the workflow manager 160 hands over the mobile device 114 to the telephony network 170 so that the mobile device 114 may thereafter communicate with telephony devices (machine-based device, personal telephony, etc.) using the telephony network 170; and thereafter, the workflow manager 160 takes the appropriate measures to recycle the assigned MSISDN number, as depicted in FIG. 8.

In this regard, referring to FIG. 8 in conjunction with FIG. 3, in accordance with example implementations, the workflow manager 160 performs a technique 800 in which the workflow manager 160 sends (block 804) an SMS message with the newly-assigned MSISDN telephony number to the mobile device 114, pursuant to block 804. It is noted that at this point, although the telephony network 170 is provisioned for the mobile device 114, the mobile device 114 is not yet allowed to access the network 170 for general communication purposes. As depicted in FIG. 8, the technique 800 includes using the workflow manager 160 to restart the mobile device 114, pursuant to block 808, and thereafter, forcing the mobile device 114 to reattach to the telephony network 170, pursuant to block 812. As discussed above, the mobile device 114 may be restarted in a number of different ways, such as through the use of a message to instruct a user of the mobile device 114 to restart the mobile device 114 or through the activation of a SIM applet of the mobile device 114. When the mobile device 114 reattaches to the telephony network 170, the mobile device 114 receives the SMS message with the assigned MSISDN telephony number (sent in block 804) and may thereafter begin a session on the telephony network 170 in which the mobile device 114 may communication with other telephony devices.

As depicted by decision block 816, in accordance with some implementations, the workflow manager 160 thereafter monitors the connection status of the mobile device 114 to the telephony network 170 to detect when the mobile device 114 has detached from the telephony network 107. Upon detecting that the mobile device 114 has detached from the telephony network 170, the workflow manager 160 recycles the MSISDN number that was assigned to the mobile device 114, pursuant to block 820. Thus, in accordance with example implementations, the MSISDN telephony numbers of a pool of MSISDN telephony numbers for the mobile devices 114 may be used and reused, i.e., recycled, such that when a given mobile device 114 detaches from the telephony network 170, the assigned MSISDN number returns to the pool of recycled MSISDN numbers to be assigned to another mobile device 114 that subsequently attaches to the telephony network 170.

Other implementations are contemplated and are within the scope of the appended claims. For example, in accordance with other implementations, the telephony network may be a telephony network (a Code Division Multiple Access (CDMA) telephony network, as a non-limiting example) other than a GSM network.

It is noted that a limited number of implementations have been disclosed herein. Those skilled in the art, having the benefit of this disclosure, will appreciate numerous modifications and variations therefrom. It is intended that the appended claims cover all such modifications and variations.

What is claimed is:

1. A method comprising:
   in response to an electronic device attaching to a telephony network, selecting a telephony number from a plurality of available telephony numbers to assign to the electronic device for a given session in which the electronic device is attached to the telephony network and provisioning the telephony network based at least in part on the assigned telephony number;
   provisioning a home location register with information pertaining to the plurality of available telephony numbers prior to the electronic device attaching to the telephony network.
   after provisioning the telephony network, forcing the electronic device to reattach to the telephony network to begin the given session using the assigned telephony number; and
   in response to the electronic device detaching to end the given session, recycling the selected telephony number by returning the selected telephony number to the plurality of available telephony numbers.

2. The method of claim 1, wherein the selecting the telephony number comprises selecting a non-routable telephony number.

3. The method of claim 1, further comprising:
   provisioning the home location register with information pertaining to subscriber identification numbers and authentication parameters associated with the plurality of telephony numbers prior to the electronic device attaching to the telephony network.

4. The method of claim 1, wherein the provisioning comprises:
   changing data stored in the electronic device indicative of a mobile subscriber identity associated with the assigned telephony number.

5. An article comprising at least one machine-readable storage medium storing instructions that upon execution by at least one processor cause said at least one processor to:
   in response to an electronic device attaching to a telephony network, select a telephony number from a plurality of available telephony numbers provisioned in a home location register to assign to the electronic device for a given session in which the electronic device is attached to the telephony network and provision the telephony network based at least in part on the assigned telephony number;
   after provisioning the telephony network, force the electronic device to reattach to the telephony network to begin the given session using the assigned telephony number: and
   in response to the electronic device detaching to end the given session, recycle the selected telephony number by returning the selected telephony number to the plurality of available telephony numbers.

6. A telephony system comprising:
   a home location register associated with a telephony network and provisioned with a plurality of use profiles containing data indicative of a plurality of telephony numbers and a plurality of subscriber identifiers; and a processor-based manager to;

in response to an electronic device attaching to the telephony network, select a telephony number from the plurality of telephony numbers to assign to the electronic device for a given session in which the electronic device is attached to the telephony network;

provision the telephony network based at least in part on the assigned telephony number;

after provisioning the telephony network, force the electronic device to reattach to the telephony network to begin the given session using the assigned. telephony number;

and in response to the electronic device detaching to end the given session, recycle the selected telephony number by returning the selected telephony number to the plurality of available telephony numbers.

7. The telephony system of claim 6, wherein the selected telephony number comprises a non-routable telephony number.

8. The telephony system of claim 6, wherein the selected telephony number comprises a routable telephony number indicative of a country code, a number planning area or national destination code, and a subscriber identification.

9. The telephony system of claim 6, wherein the manager is further configured to change data stored in the electronic device indicative of a mobile subscriber identity associated with the assigned telephony number.

10. The telephony system of claim 9, wherein the telephony number comprises a mobile subscriber integrated services digital network (MS:ISDN) number, and the mobile subscriber identity comprises an international mobile subscriber identity (IIVISI).

11. The telephony system of claim 6, wherein the manager is further configured to communicate a message to the electronic device, the message containing data indicative of the assigned telephony number.

\* \* \* \* \*

UNITED STATES PATENT AND TRADEMARK OFFICE
CERTIFICATE OF CORRECTION

PATENT NO. : 8,923,837 B2  
APPLICATION NO. : 13/272700  
DATED : December 30, 2014  
INVENTOR(S) : Philippe Wieczorek et al.

Page 1 of 1

It is certified that error appears in the above-identified patent and that said Letters Patent is hereby corrected as shown below:

In the Claims:

In column 8, line 23, in Claim 1, delete "network." and insert -- network; --, therefor.

In column 8, line 60, in Claim 5, delete "number:" and insert -- number; --, therefor.

In column 9, line 3, in Claim 6, delete "to;" and insert -- to: --, therefor.

In column 9, line 14, in Claim 6, delete "assigned." and insert -- assigned --, therefor.

In column 10, line 13, in Claim 10, delete "(MS:ISDN)" and insert -- (MSISDN) --, therefor.

In column 10, line 15, in Claim 10, delete "(IIVISI)." and insert -- (IMSI). --, therefor.

Signed and Sealed this  
Seventh Day of July, 2015

Michelle K. Lee  
*Director of the United States Patent and Trademark Office*